(12) United States Patent
Sanchez Recio et al.

(10) Patent No.: US 8,911,611 B2
(45) Date of Patent: Dec. 16, 2014

(54) METHOD OF OBTAINING ELECTROLYTIC MANGANESE FROM FERROALLOY PRODUCTION WASTE

(75) Inventors: Juan Carlos Sanchez Recio, Santander (ES); José Sancho Martinez, Oviedo (ES)

(73) Assignee: Ferroatlantica, S.L., Madrid (ES)

( * ) Notice: Subject to any disclaimer, the term of this patent is extended or adjusted under 35 U.S.C. 154(b) by 1520 days.

(21) Appl. No.: 10/580,855

(22) PCT Filed: May 25, 2004

(86) PCT No.: PCT/ES2004/000239
§ 371 (c)(1),
(2), (4) Date: May 26, 2006

(87) PCT Pub. No.: WO2005/115593
PCT Pub. Date: Dec. 8, 2005

(65) Prior Publication Data
US 2007/0114136 A1     May 24, 2007

(51) Int. Cl.
*C25C 1/10* (2006.01)
*B01D 53/73* (2006.01)

(52) U.S. Cl.
CPC . *B01D 53/73* (2013.01); *C25C 1/10* (2013.01); *B01D 2257/60* (2013.01)
USPC ............................ 205/573; 423/49; 423/215.5

(58) Field of Classification Search
USPC ........................................................ 205/573
See application file for complete search history.

(56) References Cited

U.S. PATENT DOCUMENTS

| | | | | |
|---|---|---|---|---|
| 2,259,418 A * | 10/1941 | Hannay et al. | ................ | 205/573 |
| 2,277,663 A * | 3/1942 | Francis et al. | ................ | 75/770 |
| 2,339,911 A * | 1/1944 | Chamberlain | ................ | 205/573 |
| 2,392,385 A * | 1/1946 | Hunter | ................ | 205/573 |
| 2,766,197 A * | 10/1956 | Carosella | ................ | 205/573 |
| 3,106,451 A * | 10/1963 | Globus | ................ | 423/49 |
| 3,676,107 A * | 7/1972 | Barnard et al. | ................ | 75/430 |
| 3,905,805 A * | 9/1975 | Schowalter et al. | ........... | 75/743 |
| 3,975,190 A * | 8/1976 | Van Der Meulen et al. | ..... | 423/32 |
| 4,098,728 A * | 7/1978 | Rosenblatt | ................ | 521/141 |
| 4,526,678 A * | 7/1985 | Myhren et al. | ................ | 209/2 |
| 5,286,274 A * | 2/1994 | Lindkvist et al. | ............ | 75/10.48 |
| 5,725,632 A | 3/1998 | Kiss | | |
| 5,932,086 A * | 8/1999 | Kasaaian | ................ | 205/573 |
| 2001/0033823 A1* | 10/2001 | Kuniyoshi et al. | ............ | 423/520 |
| 2004/0047773 A1* | 3/2004 | Kato et al. | ................ | 422/172 |
| 2005/0103163 A1* | 5/2005 | Ward | ................ | 75/743 |

FOREIGN PATENT DOCUMENTS

EG       B 740837       11/1955

* cited by examiner

*Primary Examiner* — Bryan D. Ripa
(74) *Attorney, Agent, or Firm* — Ladas & Parry LLP

(57) ABSTRACT

A process for obtaining electrolytic manganese from the treated sludge of the exhaust gases of ferroalloy production furnaces for any other industrial waste having magnesium in general, with a significant manganese content, by means of a process consisting of the following phases: sulphation, lixiviation, purification, conditioning and electrolysis, and whereby a manganese sulphate liquor is obtained that is suitable for the already known electrolysis process, which allows obtaining electrolytic manganese.

6 Claims, 6 Drawing Sheets

METHOD OF OBTAINING ELECTROLYTIC MANGANESE FROM FERROALLOY PRODUCTION WASTE

OBJECT OF THE INVENTION

Figure 1:
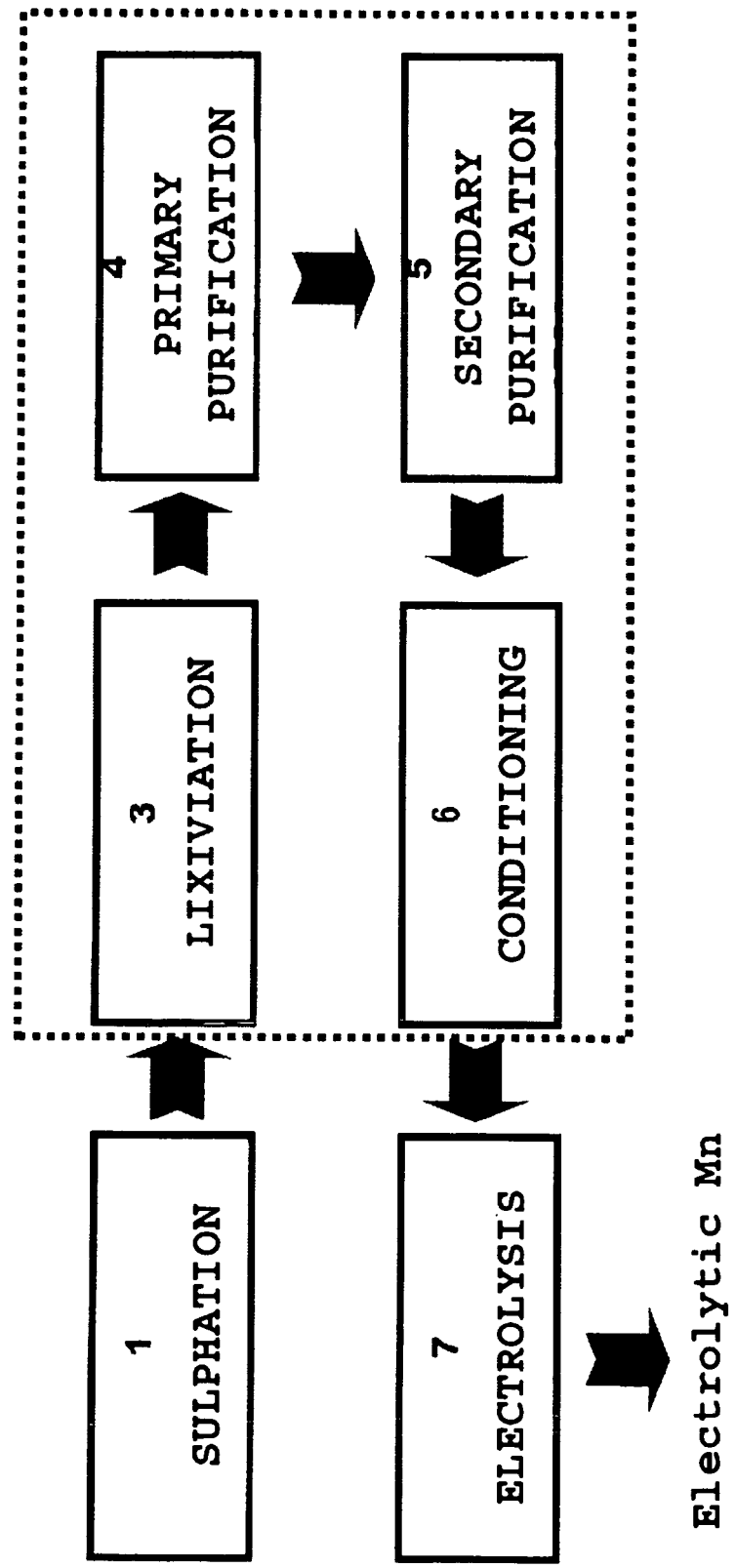

The process object of the patent entails obtaining electrolytic manganese from treated sludge of the exhaust gases of ferroalloy production furnaces for any other industrial waste having manganese in general. The intention is to achieve the integrated management of a waste which is produced worldwide in significant amounts by making use of its manganese content, which is the primary raw material in the actual production process in which it is generated.

BACKGROUND OF THE INVENTION

Manganese is a metal which is not found in nature as a free form, but rather combined in minerals in the composition of which it is found as an oxide (primarily pyrolusite) or carbonate (primarily rhodochrosite). Production processes traditionally requiring the addition of manganese have been carried out using these minerals in iron metallurgy reduction furnaces for the purpose of using the manganese as an alloy element or as a deoxidizing and desulphurizing agent in steel production. However, at the end of the 19th century, different methodologies for obtaining pure manganese from manganese minerals began to be studied for the purpose of improving the alloys in which it participated and for broadening its field of application, several processes being developed: aqueous electrolysis of manganese salts, electrothermic, carbothermic, aluminothermic and silocothermic processes.

Among the background, U.S. Pat. No. 2,511,507 for "TREATING MANGANESE ELECTROPLANTING SOLUTIONS"; U.S. Pat. No. 2,483,287 for "METHOD OF PURIFYING MANGANESE ELECTROLYTES"; U.S. Pat. No. 2,347,451 "ELECTROLYTIC DEPOSITION OF MANGANESE"; U.S. Pat. No. 2,343,293 "PROCESS FOR THE PURIFICATION OF MANGANOUS SULPHATE SOLUTIONS"; and U.K. patent 528.112 "IMPROVEMENTS IN THE ELECTROLYTIC PRODUCTION OF MANGANESE" are worth mentioning.

Of all of these processes, the one which allows obtaining greater manganese purity, has very accessible production costs and, therefore, is the most used process, is the first one, i.e. the production of manganese by means of aqueous electrolysis of salts of this metal or obtaining electrolytic manganese. This product is currently marketed with purities ranging between 99.5 and 99.9% metal.

The electrolytic route for obtaining manganese metal was first researched by Davis in 1930. However, this process did not become important until 1939, when the demand for electrolytic manganese by steel producers (for the manufacture of weapons) forced the U.S. Bureau of Mines to install a pilot plant in Knoxville (Tenn.). This plant was redesigned in 1940, and in 1944 it reached a production capacity of 1,500 t/year. In Japan, electrolytic manganese production began in 1941. The U.S. Bureau of Mines built a second pilot plant in 1942 in Boulder City. For its part, The Electrolytic Manganese Corporation of Krugersdorp, in South Africa, began production in 1955. Currently, most of the electrolytic manganese consumed worldwide is produced in China and South Africa.

The process for obtaining electrolytic manganese which has been developed at a laboratory level stems from the need to solve the greatest environmental drawback derived from the manufacture of ferroalloys for any other industrial waste having magnesium in general, which is the generation of waste as a result of the processing of the production furnace exhaust fumes. The most effective manner of processing these emissions is wet gas scrubbing, such that the particles contained therein are retained in water. The subsequent processing of this water gives rise to obtaining a waste product having a high manganese content which is difficult to use as a recyclable material due to its physical nature.

The drawback described made the requesting company assign the Cátedra de Metalurgia de la Universidad de Oviedo (Spain) four years ago the task of carrying out viability tests for the extraction of the manganese content of this waste by hydrometallurgical route for its subsequent electrolytic recovery, and to thus obtain a product of high added value. The research carried out has clearly shown that by means of certain novelties on the previously mentioned methods, it is possible to meet this challenge.

DESCRIPTION OF THE PROCESS

The starting material used in the method for obtaining electrolytic manganese object of the invention is the waste obtained in the scrubbing of the ferroalloy production furnace exhaust gases, primarily made up of:

|  | % |  | % |
|---|---|---|---|
| MnO | 5–50 | S | 0–10 |
| $SiO_2$ | 5–40 | $K_2O$ | 0–8 |
| CaO | 2–14 | $Na_2O$ | 0–5 |
| $Al_2O_3$ | 1–12 | C | 2–15 |
| MgO | 1–11 | FeO | 0–5 |

The process which has been conceived consists of the following phases:
Sulphation
Lixiviation
Purification
Electrolysis 1) Sulphation The starting industrial waste is subjected to acid etching until dryness, on one hand a byproduct consisting of the non-etched materials being obtained, and on the other hand, the metal sulphates containing ions of the different metals capable of being lixiviated that are present in the waste, primarily manganese.

2) Lixiviation

The lixiviation and filtering of that solid give rise to a liquor entraining the sulphates and other soluble substances generated during the processing in the furnace, and to obtaining a solid waste which is rendered inert by means of the washing thereof The exhaust gases of this furnace are subjected to alkaline scrubbing.

3) Purification

The purification step is indispensable for the solution to be suitable for electrolysis. Small amounts of unwanted metals in the solution would cause the contamination of the deposit, or they would even prevent the electrodeposition reactions.

There are two types of impurities which must be removed from the liquor, according to the manner in which they are to be dealt with.

A first group is made up of those which can be separated by a simple pH control. It is about taking the solution to pH conditions which force the precipitation of unwanted ions, following the Pourbaix diagrams (potential—pH), keeping the manganese in solution. The precipitation of practically all of the iron and aluminum, as well as of other less problematic contaminants such as cobalt or nickel, is thereby ensured. To increase the pH of the liquor, lime is added while the pulp is stirred. The obtained precipitate is separated by means of filtration.

Lastly, the solution is passed through an active carbon filter prior to subjecting it to secondary purification.

The second group of contaminants is made up of base metals which cannot be completely removed by pH control, since the value which is necessary to reach for the precipitation thereof interferes with the manganese precipitation pH.

The metals identified in this second group are headed up by zinc, and they are nobler than manganese. Their removal is achieved by means of their precipitation in the form of sulphide at a slightly acid pH. This precipitation requires a sufficient residence time in order for the manganese sulphide which is formed to redissolve, but not excessive in order to prevent impurities which had precipitated from redissolving.

The already purified liquor is conditioned by means of the addition of a base until reaching an almost neutral pH in order to enable its introduction in the electrolysis cell. Lastly, part of this liquor is passed through a crystallizer to remove part of its calcium and magnesium content as ammonium salts.

4) Electrolysis

Prior to being introduced in the cathode cells of special electrolysis tanks, the conditioning of the liquor is completed with the following additives:

Ammonium sulphate: added as a manganese stabilizer and buffering agent.

Hydroxylamine Sulphate: Antioxidant.

The electrolysis process is carried out in diaphragm cells in which the anolyte and catholyte are separated by a semipermeable material.

With regard to the flow of liquors in the separated electrolytes cell, the catholyte, when passing through the diaphragm, feeds the anode cell, such that the anolyte has a composition similar to the catholyte, although with a lower pH and noticeably manganese-depleted. The consumed electrolyte is therefore suitable for its recirculation to the process start. The cells must be kept at a certain temperature, and the compositions of the electrolytes must be kept homogenous.

Over time, the metal is deposited on the surface of the cathode in the form of flakes. The metal load is separated by mechanical means.

While the electrolytic manganese flakes are deposited on the cathode, manganese dioxide accumulates on the anode. Once the process has concluded, this product also requires washing with water and is subsequently separated by mechanical means.

Primary Purification

It is carried out in the lixiviation reactor itself and is achieved by increasing the pH of the solution. To separate the waste contained in the resulting pulp, which has non-etched material as well as the precipitated impurities in the form of hydroxides (mainly Fe and Al), it is subjected to filter press filtration. The waste separated here requires washing with water to recover part of the manganese which it has entrained and to improve its chemical and physical features before its subsequent deposition.

The wash water from these filtration cakes can be used as addition water to the mixer.

The electrolytic manganese obtained by the process is in the form of flakes and has a Mn content of 99.9%.

Tests for Obtaining Manganese Sulphate Liquor

EXAMPLE 1 kg of material with a humidity of 40% and an Mn content of 15% was used to start.

The material was mixed with 390 g of sulfuric acid and 390 ml of water in a ceramic recipient.

The mixture was then poured on a tray which was introduced in a furnace maintained at 300° C. for 30 minutes.

The lixiviation was carried out with prepared synthetic anolyte. In this process, the residence time for the extraction of Mn was 1 hour, during which the pulp was maintained under strong stirring. After that time elapsed, 70 g of lime were added to the same lixiviation reactor and it was left under stirring for half an hour, the pH being increased from 3.7 to 6.5 in that time. To separate the waste contained in the resulting pulp, which has both non-etched material and the precipitated impurities in the form of hydroxides (mainly Fe and Al), it was subjected to vacuum filtration. The waste separated here was subjected to washing with water to recover part of the manganese that it had entrained and to improve its chemical and physical characteristics prior to its subsequent deposition. According to the characterization carried out, this waste is of an inert type according to the applicable standards.

To remove from the liquor separated in the filtration the content it may have both of organic material as well as of traces of contaminants, it was passed through an active carbon filter.

The second purification phase involved adding 11.1 cc of sulphide and 0.65 g of zinc sulphide primer. The obtained precipitate was separated by means of filtration. 1.25 l of liquor were thus obtained, with the following chemical analysis:

| Mn (g/l) | 45 |
|---|---|
| Zn (ppm) | 15 |
| Ca (ppm) | 250 |
| Mg (g/l) | 3,5 |
| Fe (ppm) | <1 |

Electrolytic Manganese Applications

Electrolytic manganese is basically used in the aluminum industry, the resistance and ductility it provides (structural applications, resistant thin sheets, aeronautics, canning . . . ), being capable of being supplied: in the parent alloy, as an injectable dust and in mixed dust briquettes (or mechanical pre-alloy). Other uses of electrolytic manganese are: in the steel industry as a desulphurizing and fine alloying agent for high performance stainless steels and HSLA steels; in the copper and nickel alloy industry; electrolytic manganese flakes as a chemical reaction catalyst; manganite production for the manufacture of temperature-controlled variable resistors; the manufacture of zinc-manganese ferrites for intermediate power electronic applications and as a pigment; manufacture of welding rods.

PROCESS DIAGRAMS

Description of the Diagrams of a Preferred Embodiment of the Invention.

FIG. 1 shows the block diagram of the process which starts with the sulphation phase (1), followed by the hydrometallurgical phase consisting of four steps: lixiviation (3), primary purification (4), secondary purification (5) and conditioning (6), to finally reach the electrolysis (7) phase for obtaining electrolytic manganese.

Figure 2:
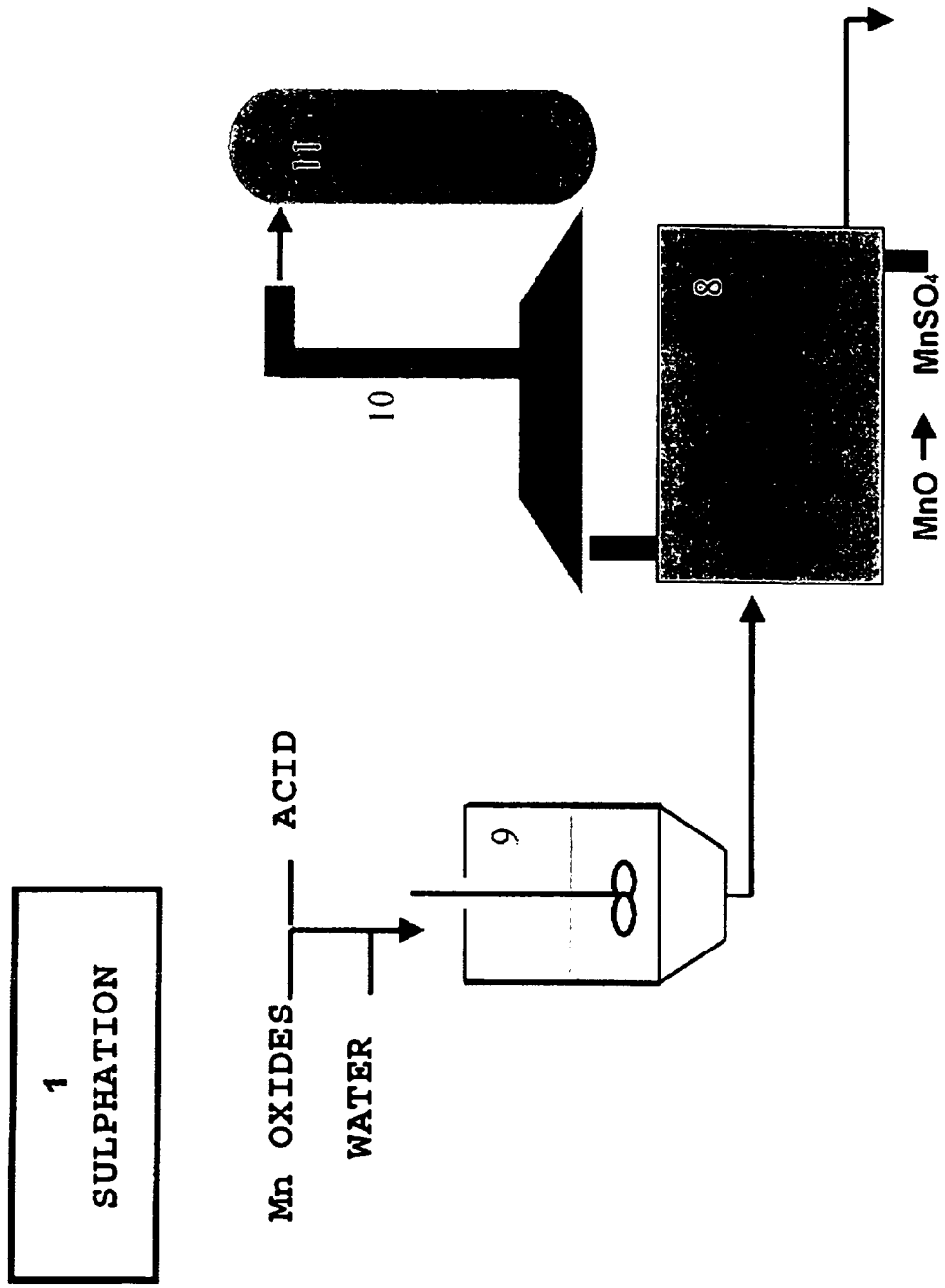

FIG. 2 schematically shows the diagram corresponding to the sulphation phase (1) involving the processing in a furnace (8) of the material supplied by a mixer (9), gasses being generated which are extracted in a forced manner from said furnace (8) through a chimney (10) and neutralized in a washing column (11) with the suitable reagent.

Figure 3:
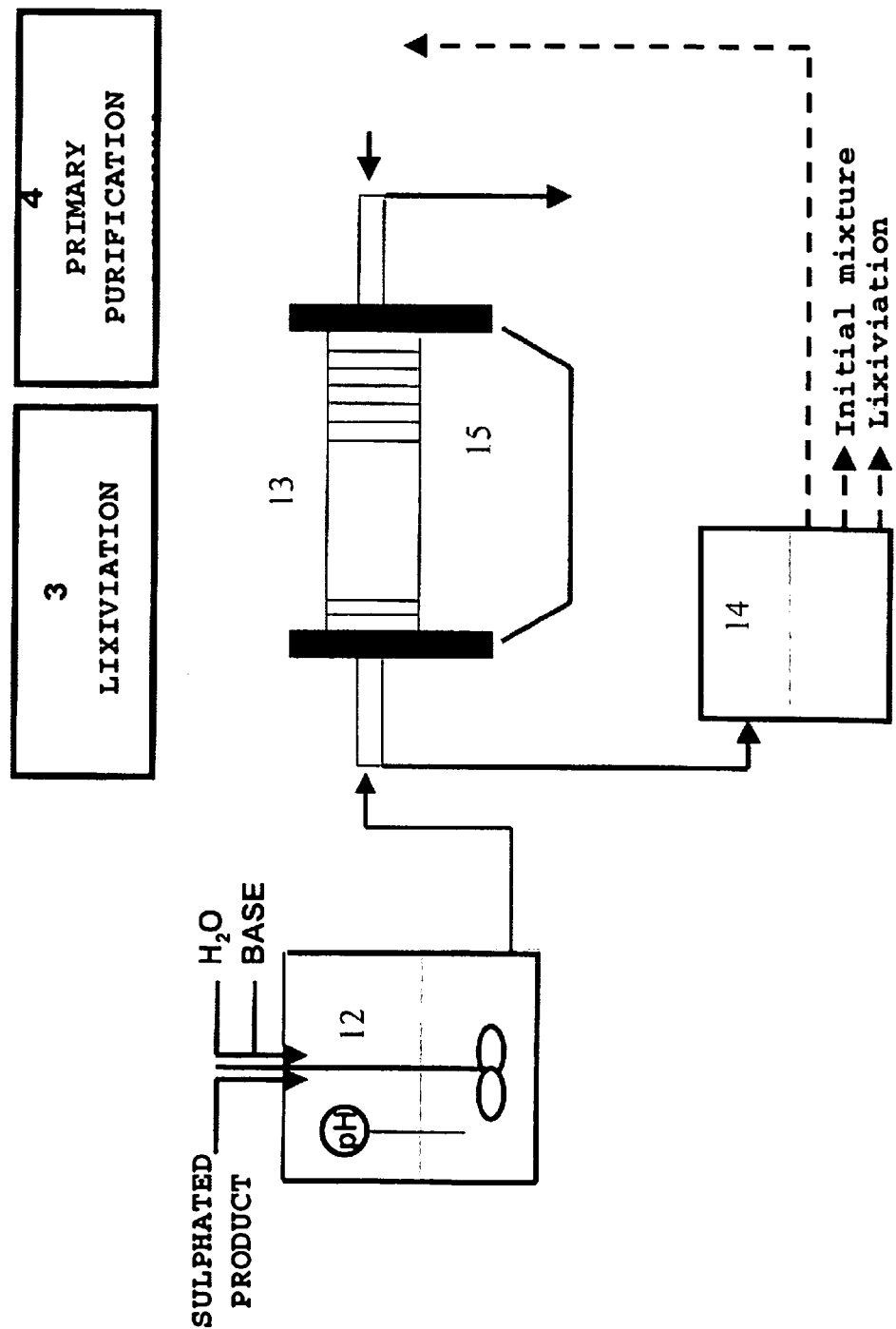

FIG. 3 schematically shows the lixiviation (3) and primary purification (4) steps in which the product resulting from the sulphation phase (1) is treated in a tank (12) with an antacid coating, a pulp being obtained which is passed through a filter press (13) where washing of the filtration cakes can be further carried out countercurrently. This washing is carried out with water supplied form a tank (14), which can subsequently be used both in the initial mixture of the process and in the lixiviation phase. The inert waste is collected in the pan (15) at the bottom of the filter press.

Figure 4:
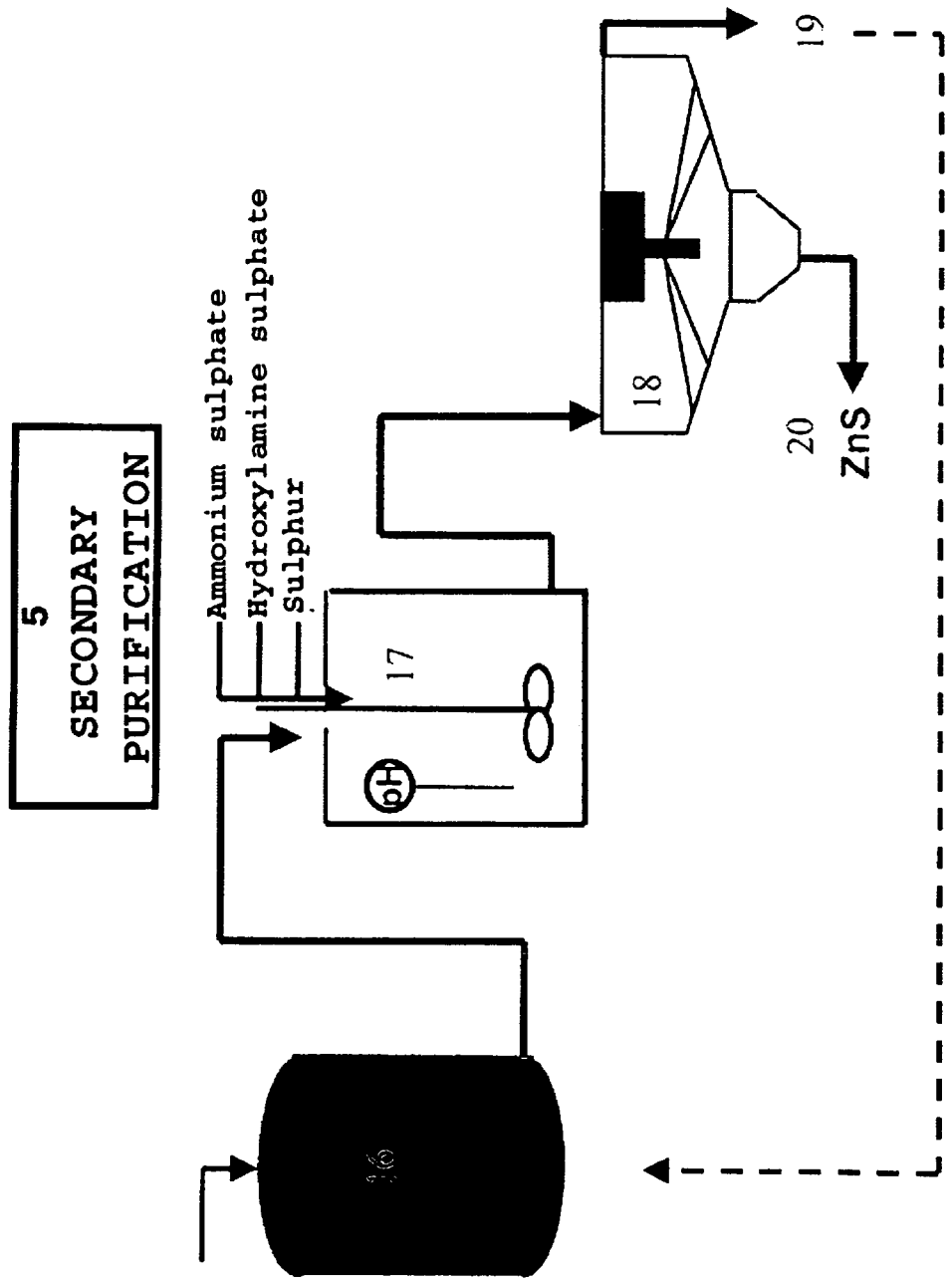

FIG. 4 corresponds to the secondary purification step (5), in which the primary liquor of the previous step is filtered with an active carbon filter (16) prior to being taken to the secondary purification tank (17), where the remaining impurities precipitate in the form of sulphides which are separated through another filtration process (18), purified liquor (19) and a waste product, ZnS (20), finally being obtained.

Figure 5:
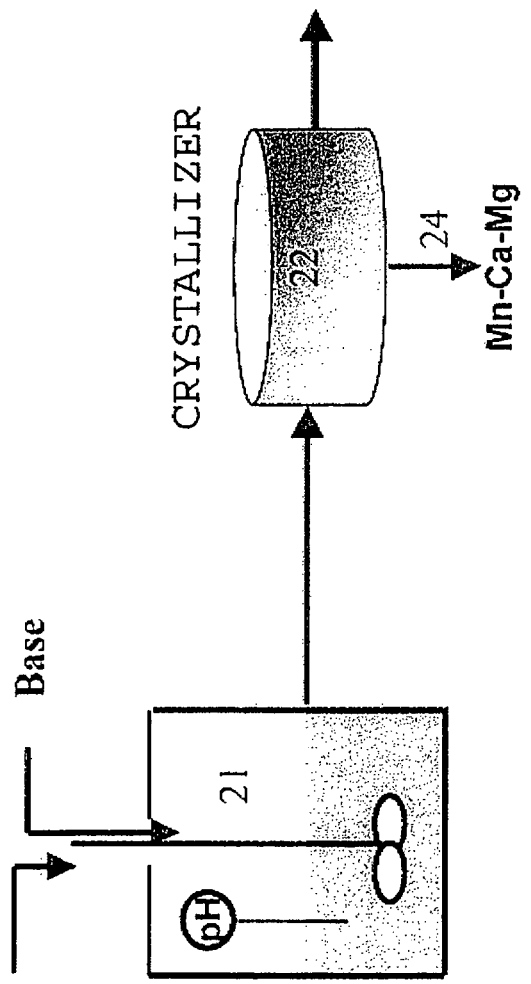

FIG. 5 schematically shows the conditioning step (6) in which the purified liquor is subjected to a pH increase in a tank (21), to be subsequently treated in a crystallizer (22) where the precipitation of Ca and Mg ammonium salts (24) of the liquor is favored.

Figure 6:
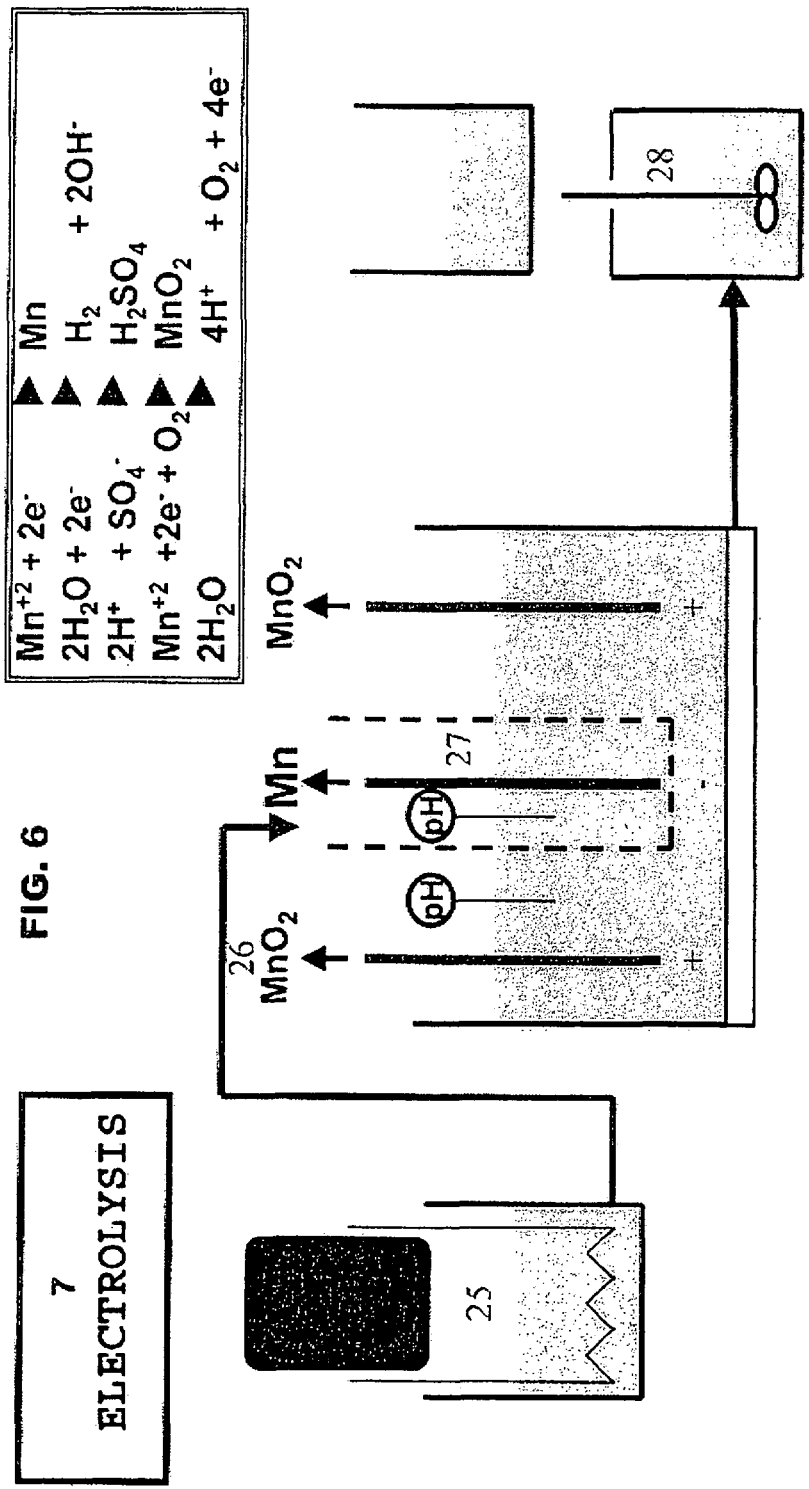

FIG. 6 schematically shows the electrolysis phase (7) of the liquor which is treated in a cell (26) provided with a catholyte heated by the action of a heat exchanger existing in the feed tank (25). The cell is a polyester diaphragm cell, and two anodes and one cathode are immersed inside, the latter being inside its own compartment. There is an immersion tank (27) to carry out the washing of the cathode after the deposition of the electrolytic Mn on the surface thereof. On the other hand, the anode sludges of the cell are accumulated and evacuated from the double bottom of the cell, passing to be treated in a sludge flocculation tank (28).

The invention claimed is:

1. A method of obtaining electrolytic manganese from treated sludge of exhaust gases from silico- and ferroalloy production furnaces, comprising:
    a sulfation step wherein the sludge is treated with sulfuric acid within a furnace and heated until dry, in which near-stoichiometric consumption of the acid is used;
    a lixiviation step following the sulfation step, comprising mixing the product of the sulfation step with sulfuric acid to produce a leach solution;
    a primary purification step following the lixiviation step, comprising the removal of impurities, comprising primarily aluminum and iron, by the adjustment of the pH of the leach solution through the addition of lime so as to cause the precipitation of the impurities as hydroxides wherein the precipitates are removed from the leach solution by filtration to form a primary solution;
    an organic removal step, comprising passing the primary solution obtained from the primary purification step through an active carbon filter;
    a secondary purification step, following the organic removal step, comprising a step of removing additional impurities, comprising primarily zinc, by the addition of a sulfur containing compound under slightly acidic conditions causing the additional impurities to precipitate out as sulfides so as to form a secondary solution;
    a conditioning step, comprising steps of: (a) increasing the pH of the secondary solution; followed by (b) a crystallization step wherein the secondary solution having the increased pH is treated in a crystallizer under conditions to favor the precipitation of calcium and magnesium as ammonium salts; and concluding with
    an electrolysis step, wherein the electrolysis step results in a manganese purity of 99.9%.

2. The method of claim 1, wherein the sulfation step is carried out in a furnace in which exothermic reactions occur inside the furnace and on PTFE trays, generating $SO_2$ gases.

3. The method of claim 1, wherein the lixiviation and primary purification steps are carried out with a consumed anolyte of an electrolysis cell or with a synthetic anolyte.

4. The method of claim 1, wherein in said lixiviation step, an anolyte is used as a lixiviation agent, and wherein said lixiviation step is carried out with strong stirring in a reactor coated with an acid-resistant material.

5. The method of claim 1, wherein the primary purification step is carried out in the same reactor as the lixiviation step, and the pH of the precipitates is raised to values near neutral pH, wherein said filtration comprises filtering the precipitates in a filter press and washing with water to obtain an inert waste.

6. The method of claim 5, wherein the washing water of the precipitates is used as added water to a mixer in an initial step of the process prior to the sulfation step, or the washing water can be re-used successive times to concentrate the manganese therein.

* * * * *